(12) United States Patent
Bouvet et al.

(10) Patent No.: US 10,966,144 B2
(45) Date of Patent: Mar. 30, 2021

(54) METHOD AND DEVICE FOR MANAGING THE CONNECTION OF A TERMINAL TO AN ACCESS NETWORK

(71) Applicant: ORANGE, Paris (FR)

(72) Inventors: Bertrand Bouvet, Perros-Guirec (FR); Fabrice Fauchoux, Louannec (FR); Catherine Salou, Lannion (FR)

(73) Assignee: Orange, Paris (FR)

( * ) Notice: Subject to any disclaimer, the term of this patent is extended or adjusted under 35 U.S.C. 154(b) by 480 days.

(21) Appl. No.: 15/315,089

(22) PCT Filed: Jun. 15, 2015

(86) PCT No.: PCT/FR2015/051579
§ 371 (c)(1),
(2) Date: Nov. 30, 2016

(87) PCT Pub. No.: WO2016/001503
PCT Pub. Date: Jan. 7, 2016

(65) Prior Publication Data
US 2018/0220362 A1    Aug. 2, 2018

(30) Foreign Application Priority Data
Jun. 30, 2014    (FR) ...................................... 1456120

(51) Int. Cl.
*H04W 48/16* (2009.01)
*H04W 48/18* (2009.01)
(Continued)

(52) U.S. Cl.
CPC ............. *H04W 48/16* (2013.01); *H04W 8/24* (2013.01); *H04W 40/24* (2013.01); *H04W 48/18* (2013.01); *H04W 76/16* (2018.02)

(58) Field of Classification Search
CPC ..... H04W 48/16; H04W 48/18; H04W 40/24; H04W 8/24; H04W 76/16
See application file for complete search history.

(56) References Cited

U.S. PATENT DOCUMENTS

2007/0255797 A1    11/2007    Dun
2009/0129372 A1*   5/2009    Pandey .............. G06Q 30/0267
                                                  370/352
(Continued)

FOREIGN PATENT DOCUMENTS

WO    2012156581 A1    11/2012
WO    2014006350 A1     1/2014

OTHER PUBLICATIONS

The International Search Report for the PCT/FR2015/051579 application.
(Continued)

*Primary Examiner* — Oussama Roudani
(74) *Attorney, Agent, or Firm* — Haverstock & Owens LLP

(57) ABSTRACT

The invention concerns a method for managing the connection of a first terminal connected to a first access network accessing a communication network and capable of connecting to a second access network accessing said communication network, implemented by a management module of the communication network, said management module being capable of determining a list of access networks to which the first terminal is likely to connect. After receiving (E209) a piece of connectivity information relative to a second terminal, the management method comprises a step (E210) of updating the list of access networks according to the received connectivity information and a step (E211) of transmitting said updated list to the first terminal such that the first terminal connects (E212) to the second access network.

7 Claims, 4 Drawing Sheets

Figure 2B:
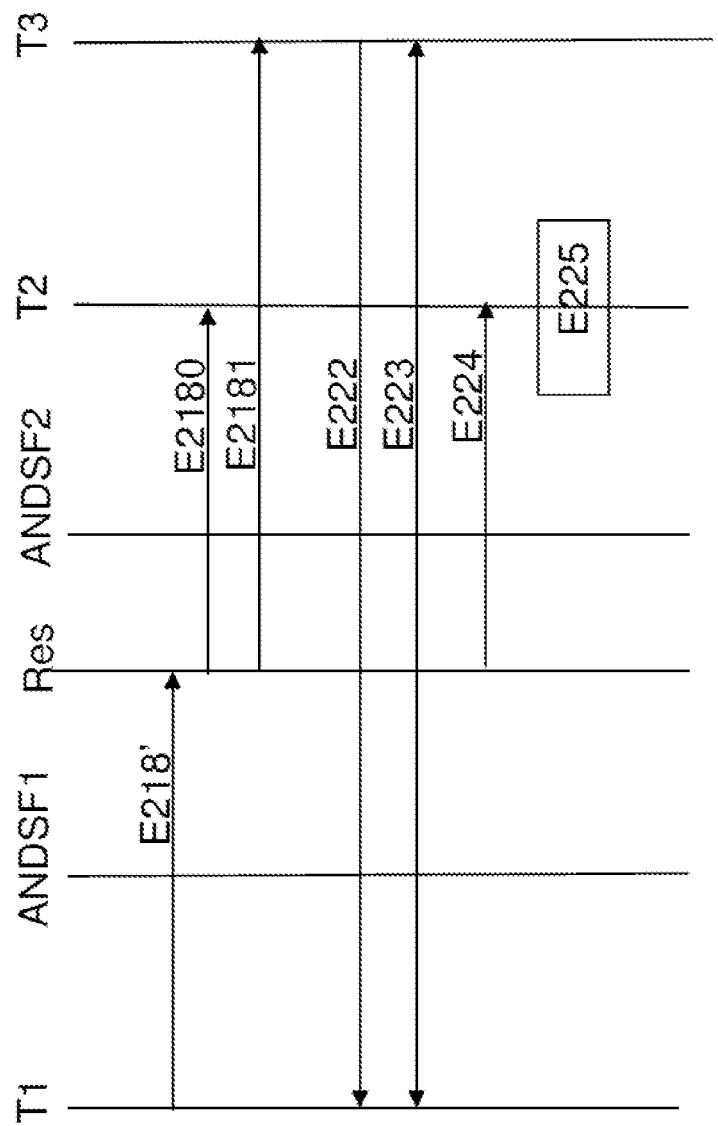

(51) Int. Cl.
*H04W 76/16* (2018.01)
*H04W 8/24* (2009.01)
*H04W 40/24* (2009.01)

(56) References Cited

U.S. PATENT DOCUMENTS

| | | | | |
|---|---|---|---|---|
| 2010/0009676 A1* | 1/2010 | Cormier | ............... | H04L 45/52 |
| | | | | 455/426.1 |
| 2010/0234029 A1* | 9/2010 | Ishii | ............... | H04W 36/0066 |
| | | | | 455/437 |
| 2012/0033583 A1* | 2/2012 | Hu | ............... | H04W 48/18 |
| | | | | 370/254 |
| 2012/0307687 A1* | 12/2012 | Zhang | ............... | H04W 68/005 |
| | | | | 370/259 |
| 2014/0133297 A1* | 5/2014 | Raleigh | ............... | H04W 36/245 |
| | | | | 370/230 |
| 2014/0307550 A1* | 10/2014 | Forssell | ............... | H04W 36/22 |
| | | | | 370/235 |
| 2016/0088526 A1* | 3/2016 | Chen | ............... | H04W 8/22 |
| | | | | 370/331 |

OTHER PUBLICATIONS

The Written Opinion for the PCT/FR2015/051579 application.
The French Search Report for the FR 1456120 application.

* cited by examiner

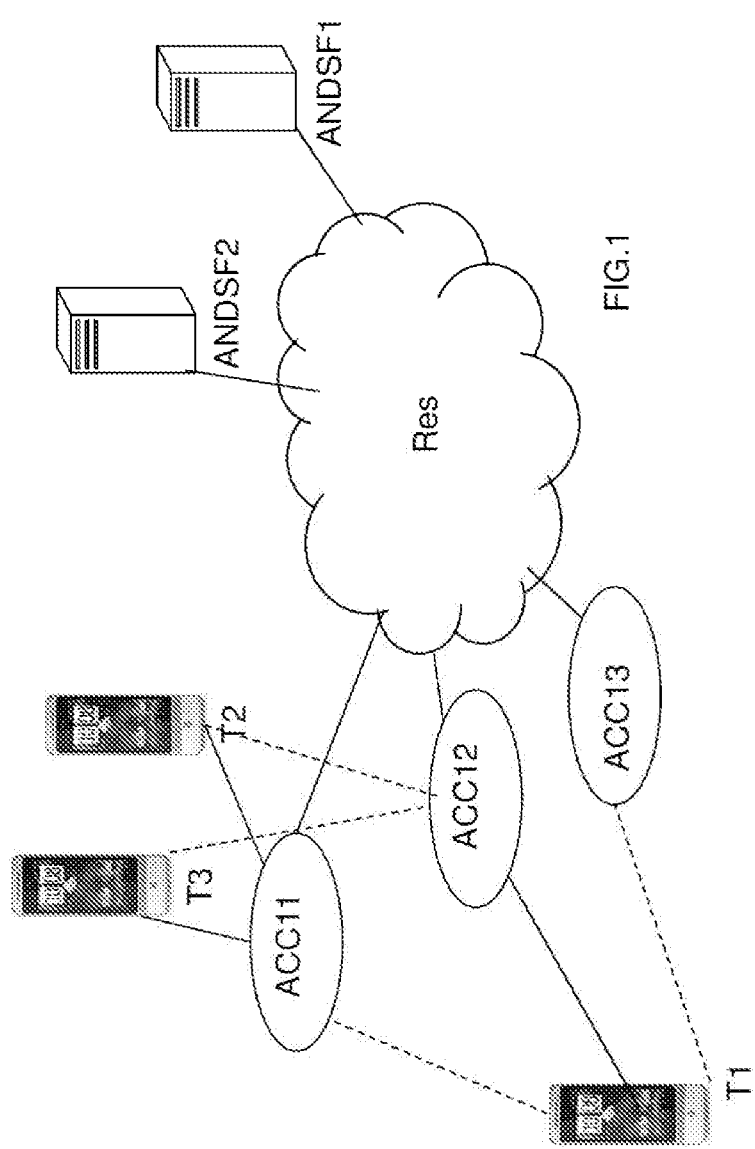
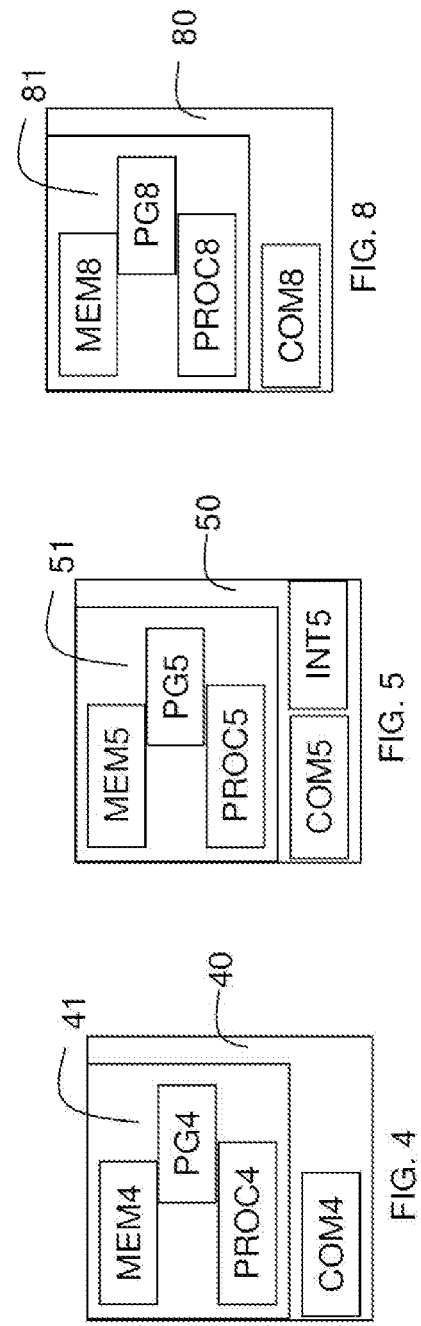

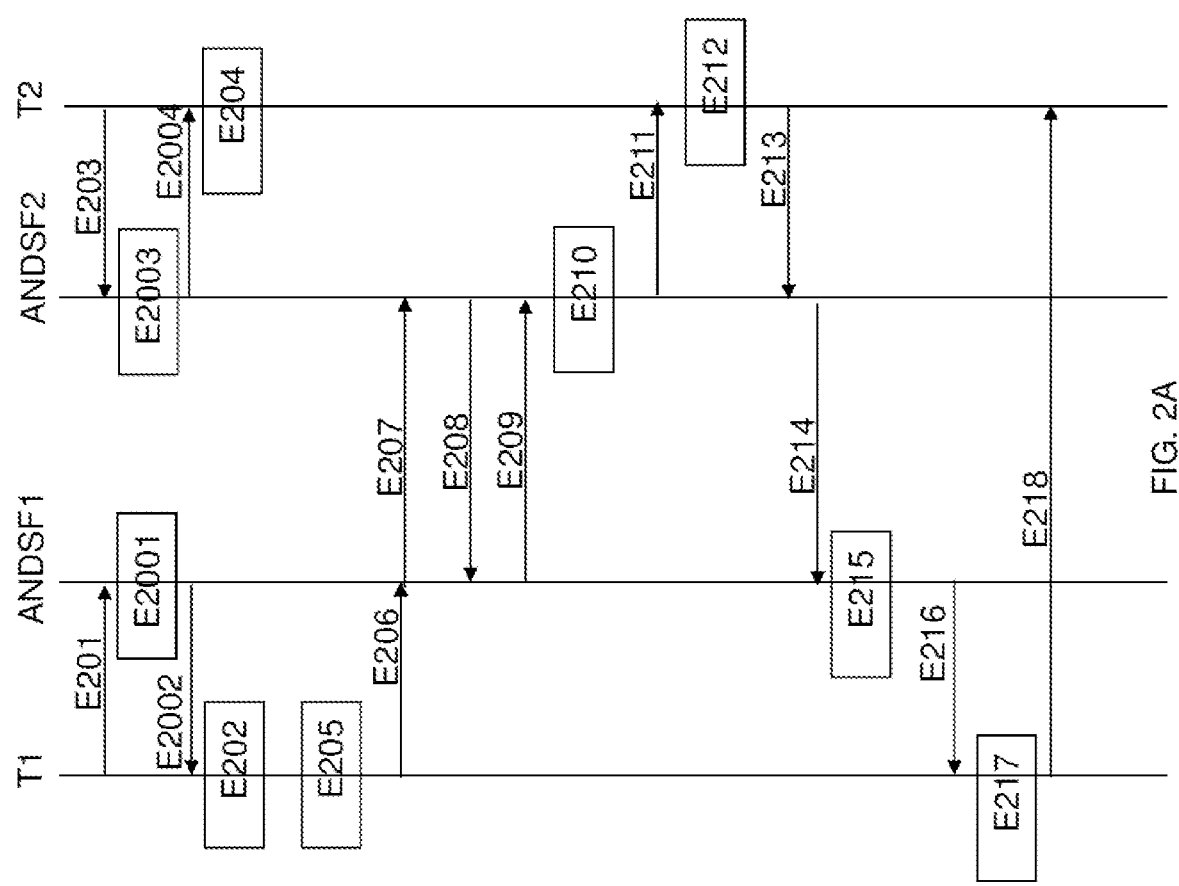

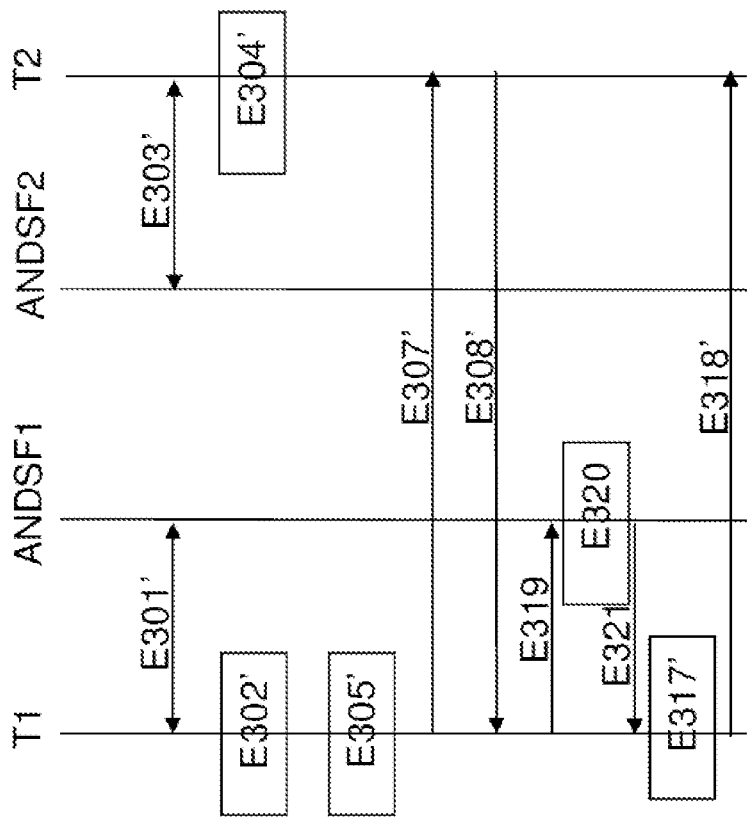
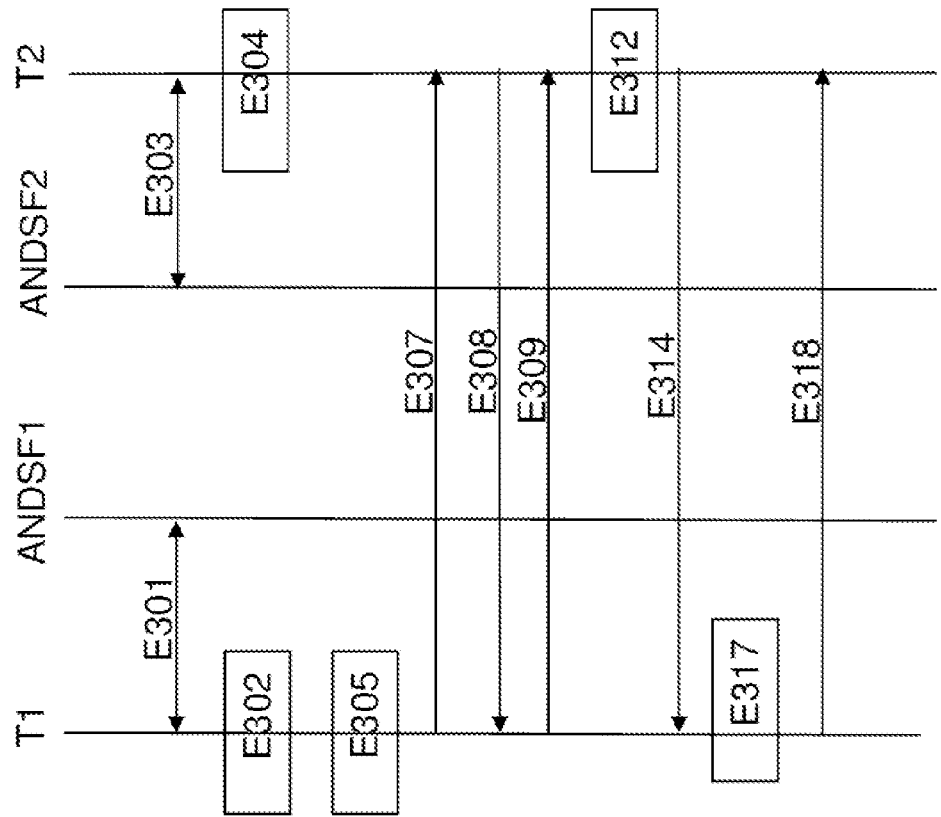
FIG. 3B
FIG. 3A

METHOD AND DEVICE FOR MANAGING THE CONNECTION OF A TERMINAL TO AN ACCESS NETWORK

When a terminal has the possibility of connecting to multiple access networks available around the terminal in order to access a communication network, the terminal operator may indicate to the terminal the access network to which it has to connect.

The terminal operator here means the operator of the communication network to which the terminal user is subscribed.

The terminal operator requires the selection of an access network accessing the terminal according to various criteria e.g. the load or the available bandwidth of the access networks at the time the terminal wishes to connect to a communication network, the location of the terminal, the time of the connection, the subscription conditions of the terminal user, the services available on each access network, and the applications used by the customer.

The operator may use an access network discovery and selection function defined by the 3GPP standard (ANDSF for Access Network Discovery and Selection Function in English). Such a function is partly implemented by an ANDSF network module of the communication network managed by the operator and partly by a local module of the terminal. The ANDSF network module of the communication network establishes an ordered list of the preferred access networks of the operator which are close to the terminal according to criteria defined by the operator. Then, the ANDSF network module of the communication network transmits this ordered list to the terminal in order that the terminal may select the first access network in the list and connect thereto.

Thus, for example, when a first terminal capable of connecting to a 4G mobile access network is close to a WIFI access network, for establishing "data" (in English) communications, the operator of the first terminal may prompt the first terminal, via the ANDSF function, to connect preferably to the WIFI access network and not to the 4G mobile access network.

When a user of the first terminal wishes to establish a communication with a second terminal in voice or videophone mode, for example, the first terminal sends a communication request to the second terminal for establishing a communication according to a predetermined communication service. Such a predetermined communication service is notably defined:

by the communication application of the first terminal that has served to transmit the communication request, such as a native application of the first terminal or a non-native application if such an application has been installed on the first terminal, and by the access network to which the first terminal is connected, such as a 4G mobile access network or a 2G or 3G mobile access network operating in circuit mode, etc.

It may be that the operator of the second terminal also uses an ANDSF function in its communication network then imposing on the second terminal the access network to which the second terminal must connect. The communication request sent by the first terminal then risks failing or limiting the functionalities of the service or using the resources of the communication network unnecessarily, if the second terminal is not connected to the access network used by the predetermined communication service serving to send the communication request.

For example, if the first terminal is connected to a 4G access network and sends a communication request according to the SIP protocol over the IP communication network, and the second terminal is connected to a WIFI access network for communicating over an IP communication network, and not to a 4G access network, the communication request sent by the first terminal may not be routed to the second terminal.

According to another example, if the first terminal is connected to a 4G access network and sends a communication request according to the SIP protocol over the IP communication network, and the second terminal is connected to a 3G access network, the communication request sent by the first terminal is routed to the second terminal using interconnection resources between the 3G and 4G access networks necessary for establishing such a communication between different access networks. When the access networks are managed by different operators, such an arrangement requires that the operators have defined such an interconnection together. In addition, such an arrangement limits the end-to-end use of the functionalities offered by the 4G access network.

According to another example, if the first terminal is connected to a WIFI access network and sends a communication request according to the SIP protocol e.g. over the IP communication network, and the second terminal is connected to a 4G or 3G mobile access network, for example, the communication request sent by the first terminal may not be routed to the second terminal.

One of the purposes of the invention is to make improvements with respect to the prior art.

To this end it provides a method for managing the connection of a first terminal connected to a first access network accessing a communication network and capable of connecting to a second access network accessing said communication network, implemented by a management module of the communication network. Said management module is capable of determining a list of access networks to which the first terminal is likely to connect. After receiving a piece of connectivity information relating to a second terminal, the method includes:

a step of updating the list of access networks according to the received connectivity information, a step of transmitting said updated list to the first terminal so that the first terminal connects to the second access network.

According to the invention, the management module, e.g. an ANDSF module, may thus modify the connection of a first terminal according to the connectivity of a second terminal. For example, the second terminal is a terminal with which a communication is desired by the first terminal.

Connectivity of a terminal here means the ability of a terminal to connect to an access network close to the terminal.

The connectivity information relating to the second terminal then indicates to the management module the available access networks close to the second terminal, and the connection capabilities of the second terminal to such access networks. From the connectivity information relating to the second terminal, the management module can thus determine the access networks to which the second terminal is capable of connecting.

Connection of a terminal to an access network, here means the fact of the terminal being connected to the access network.

Thanks to the method according to the invention, the conditions for establishing a communication between the first terminal and the second terminal are optimized before establishing the communication.

Thus, for example, when the second access network is a 4G mobile access network, the method according to the invention enables the first terminal to connect to the 4G mobile access network before sending the request for establishing the communication between the first terminal and the second terminal via the 4G mobile access network. The communication thus established may benefit from the end-to-end quality of service implemented by the 4G mobile access network.

The various embodiments or features mentioned below may be added independently or in combination with one another, to the features of the management method defined above.

According to a particular embodiment of the invention, the connectivity information relating to the second terminal corresponds to a piece of information indicating that the second terminal is not capable of connecting to the first access network.

According to this particular embodiment of the invention, the connectivity information relating to the second terminal may be received following a step of the management module sending a request for querying the connectivity of the second terminal or a request for connecting the second terminal to the first access network, the querying or connection request having been sent prior to the first terminal sending a communication request to the second terminal.

According to this particular embodiment of the invention, the connectivity information relating to the second terminal may also be received following a step of the first terminal sending a request for connecting the first terminal to the second access network.

This particular embodiment of the invention enables the first terminal to be able to implement a fallback solution when the first terminal wishes to initiate a communication with the second terminal via the first access network and the second terminal is not capable of connecting to the first access network.

According to this particular embodiment of the invention and according to a first variant, the request for querying the connectivity of the second terminal is used to query a management module associated with the second terminal makes it possible on the available access networks close to the second terminal. The connectivity information relating to the second terminal is then a response to such a querying request.

According to this particular embodiment of the invention and according to a second variant, the request for connecting the second terminal to the first access network is used to request the modification of the connection of the second terminal when the second terminal is not connected to the first access network. If such a modification is not possible, e.g. because the second terminal has no first access network close by or because such a connection is not authorized by the operator of the second terminal, the connectivity information relating to the second terminal informs the management module that the connection of the second terminal to the first access network is not possible.

According to this particular embodiment of the invention and according to a third variant, when the first terminal has obtained a piece of connectivity information relating to the second terminal indicating that the second terminal is not capable of connecting to the first access network, the first terminal sends a request to the management module for connecting to the second access network. Such a connection request is, for example, a request for authorization to connect to the second access network.

According to this particular embodiment of the invention and according to any one of the first and second variants, the first terminal then sends a communication request to the second terminal via the second access network, which thus avoids the use of interconnection resources necessary for establishing a communication between a terminal connected to the first access network and a terminal connected to the second access network.

According to another particular embodiment of the invention, the connectivity information relating to the second terminal corresponds to a request for connecting the first terminal to the second access network, said connection request having been sent by a management module associated with the second terminal, prior to the second terminal sending a communication request to the first terminal. This particular embodiment of the invention, when the second terminal wishes to initiate a communication with the first terminal via the second access network, makes it possible for the connection of the first terminal to be modified prior to the first terminal receiving the communication request initiated by the second terminal.

According to another particular embodiment of the invention, the updated list is transmitted with a piece of information on the validity of said updated list indicating that the updated list is valid until the end of a communication to be established between the first terminal and the second terminal.

This particular embodiment of the invention makes it possible to temporarily modify the connection of the first terminal. Thus, when the communication between the first terminal and the second terminal is completed, the first terminal may terminate the connection to the second access network. The resources of the second access network are thus used only for the time of the communication.

The invention also relates to a device for managing the connection of a first terminal capable of implementing the management method described above according to any one of the particular embodiments of the invention.

The invention also relates to a method for establishing a communication to be established via at least one access network accessing a communication network between a terminal transmitting a communication request and a destination terminal of said communication request. Following a step of detecting the activation of the communication request, and prior to the transmitting terminal sending the communication request to a destination terminal, such a method includes:

a step of determining an access network capable of being used by the transmitting terminal for sending said communication request, a step of sending a request for connecting the destination terminal to the determined access network.

Sending the request for connecting the destination terminal to the determined access network may be done:

by the transmitting terminal to the destination terminal, or by a first management module of the communication network associated with the transmitting terminal to a second management module of the communication network associated with the destination terminal.

When the request for connecting the destination terminal to the determined access network is sent by the transmitting terminal, the destination terminal may implement the method for receiving a request for connecting a terminal to an access network according to the invention which will be described farther on so that the destination terminal connects to the determined access network. When the request for connecting the destination terminal to the determined access network is sent by the first management module of the communication network associated with the transmitting terminal, the second management module of the communication network associated with the destination terminal may implement the method for managing the connection of a terminal to an access network defined above so that the destination terminal connects to the determined access network.

Thus, according to the invention, prior to the transmitting terminal sending the communication request to the destination terminal, the connection of the destination terminal is established so that the requested communication may be established via an access network to which the transmitting terminal is connected or capable of being connected. For example, when the access network is a 4G mobile access network, the method according to the invention thus avoids the use of interconnection resources between different types of networks and benefits from the end-to-end quality of service guaranteed by the 4G mobile communication network.

The various embodiments or features mentioned below may be added independently or in combination with one another, to the features of the method for establishing a communication as defined above.

According to a particular embodiment of the invention, prior to sending the request for connecting the destination terminal to the access network, the method for establishing the communication includes:
  a step of the transmitting terminal or the first management module of the communication network sending a request for querying the connectivity of the destination terminal,
  a step of receiving a response to said querying request including at least one piece of information relating to the connectivity of the destination terminal,
  the connection request being sent only if the at least one piece of information relating to the connectivity of the destination terminal indicates that the destination terminal is not connected to the access network and that the destination terminal is capable of connecting to the access network.

According to this particular embodiment of the invention, the request for connecting the destination terminal to the access network is not sent:
  if the destination terminal is already connected to the access network, or
  when the destination terminal is not connected to the access network, if the destination terminal is not capable of connecting to the access network.

This particular embodiment of the invention avoids transmitting a connection request unnecessarily and makes it possible to optimize the resources of the communication network.

According to another particular embodiment of the invention, the method for establishing a communication includes a step of receiving a piece of connectivity information relating to the destination terminal and a step of connecting the transmitting terminal to another access network in order to establish the requested communication via the other access network according to the received connectivity information.

The received connectivity information indicates, for example, that the destination terminal is not connected to the access network or that the destination terminal is not capable of connecting to the access network.

According to this particular embodiment of the invention, when the destination terminal is not capable of connecting to the access network, or when the destination terminal has not been able to connect to the access network, the transmitting terminal modifies its connection by connecting to another access network according to the received connectivity information.

For example, when the access network is a 4G mobile access network and the other access network is a 3G mobile access network to which the destination terminal is capable of connecting, the transmitting terminal may thus establish the requested communication with the destination terminal via the 3G mobile access network. This particular embodiment of the invention offers a fallback solution for establishing the communication that preserves the resources of the communication network. Notably this particular embodiment of the invention avoids using interconnection resources between a 4G mobile network and a 3G mobile network, when the connection to a 4G mobile access network is not possible at the destination terminal of the communication.

The invention also relates to a terminal for establishing a communication capable of implementing the method for establishing a communication described above according to any one of the particular embodiments of the invention.

The invention also relates to a method for receiving a request for connecting a destination terminal of a communication request sent subsequently by a transmitting terminal, to a first access network accessing a communication network. Such a method includes:
  a step of receiving a request for connecting the destination terminal to the first access network, originating from the transmitting terminal,
  when the destination terminal is connected to a different access network from the first access network and the destination terminal is capable of connecting to the first access network, a step of modifying the connection of the destination terminal so that the destination terminal connects to the first access network.

The connection of the destination terminal is thus modified prior to receiving a communication request, thus notably avoiding the use of interconnection resources of the communication network and benefiting from the services of the first access network. For example, when the first access network is a 4G mobile access network, the communication subsequently established via the first access network will benefit:
  from the quality of service guaranteed by such an access network,
  from the quality of user experience via the use of a wide band encoder, e.g. an AMR-WB (for Adaptive Multi Rate Wide Band in English) encoder, or an EVS (for Enhanced Voice Service in English) high definition encoder, for audio data,
  from functionalities such as video telephony with high interactivity thanks to very low transmission delays or "roaming" ("itinérance" in French) services with a guaranteed end-to-end 4G mobile network.

The various embodiments or features mentioned below may be added independently or in combination with one another, to the features of the method for receiving a connection request defined above.

According to a particular embodiment of the invention, the method includes:
  a step of receiving a request for querying the connectivity of the destination terminal, a step of sending a response to said querying request including at least one piece of information relating to the connectivity of the destination terminal.

According to a particular embodiment of the invention, following a step of receiving a cancellation of the communication request or after a predetermined time after receiving the connection request, the method for receiving a connection request includes a step of disconnecting the destination terminal from said first access network. For example, the communication request may be canceled because the user of the transmitting terminal no longer wishes to be put in communication with the destination terminal or the communication request has been accepted by another destination terminal associated with the same public identity as the destination terminal. In this case, the destination terminal disconnects from the first access network making it possible to optimize the resources of the first access network.

The invention also relates to a terminal for receiving a connection request capable of implementing the method for receiving a connection request described above according to any one of the particular embodiments of the invention.

The invention also relates to a message requesting the connection of a destination terminal of a communication request sent by a transmitting terminal, to a first access network. Such a message includes a piece of connectivity information relating to the transmitting terminal.

For example, the connectivity information relating to the transmitting terminal indicates to the destination terminal to connect to a first access network, when the destination terminal is connected to a different access network from the first access network and the destination terminal is capable of connecting to the first access network.

According to a particular embodiment of the invention, the connection request message includes a piece of information indicating that the purpose of the connection request is to establish, via the first access network, a communication initiated by the transmitting terminal, intended for the destination terminal.

Thus, the device receiving the connection request message knows the reason for the request to modify the connection of the destination terminal. The device receiving the connection request message may be the destination terminal or an ANDSF management module of the communication network associated with the destination terminal.

If the connection of the destination terminal is determined by an ANDSF function of the communication network, the ANDSF function of the communication network may thus take into account this information in order to modify the connection of the destination terminal. For example, when the connection request is sent to the management module of the communication network associated with the destination terminal, the management module takes into account the connection request and the criteria set by the communication network operator and sends a new list of available access networks to the destination terminal so that the destination terminal modifies its connection according to this new list.

According to another example, when the connection request is sent to the destination terminal, the destination terminal modifies its connection according to the connection request and the user preferences stored on the destination terminal.

The invention also relates to a response message to a request for querying the connectivity of a destination terminal of a communication request, said communication request being sent by a transmitting terminal. Such a message includes a piece of information representative of the connectivity of the destination terminal indicating to the transmitting terminal at least one access network according to which said communication request may be sent.

Thus, the device receiving such a message, e.g. the transmitting terminal or an ANDSF management module associated with the transmitting terminal, knows the connectivity of the destination terminal and may request, where appropriate, the destination terminal to modify the connection of the destination terminal to an access network or the transmitting terminal to modify the connection of the transmitting terminal to an access network.

In a particular embodiment of the invention, the various steps in the method for managing the connection, establishing a communication and receiving a connection request are implemented by computer program instructions.

Accordingly, the invention is also aimed at a computer program on an information medium, this program being likely to be implemented respectively in a terminal or more generally in a computer, this program comprising instructions adapted to the implementation of the various steps in the methods that have just been described.

This program may use any programming language, and be in the form of source code, object code, or intermediate code between source code and object code, such as in a partially compiled form, or in any other desirable form.

The invention is also aimed at an information medium capable of being read by a computer, and comprising instructions of a computer program such as that mentioned above.

The information medium may be any entity or device capable of storing the program. For example, the medium may comprise a means of storage, such as a ROM, e.g. a CD-ROM or a microelectronic circuit ROM, or a magnetic or electronic recording means, e.g. a USB stick or a hard disk.

Moreover, the information medium may be a transmissible medium such as an electrical or optical signal, which may be routed via an electrical or optical cable, by radio or by other means. The program according to the invention may in particular be downloaded on an Internet type network.

Alternatively, the information medium may be an integrated circuit incorporating the program, the circuit being adapted for executing or for being used in the execution of the connection management method or the method for establishing a communication or the method for receiving a connection request in question.

The advantages of the computer program comprising instructions adapted for implementing the various steps in the management method, the method for establishing a communication or the method for receiving a connection request are identical to those described in relation to the method in question according to any one of the particular embodiments mentioned above.

LIST OF FIGURES

Other advantages and features of the invention will appear more clearly on reading the following description of particular embodiments of the invention, given as simple, illustrative and non-restrictive examples, and the accompanying drawings, in which:

FIG. 1 illustrates an environment for implementing the invention according to a particular embodiment of the invention, FIG. 2A illustrates steps in the method for establishing a communication between a transmitting terminal and a destination terminal, steps in the method for receiving a request for connecting a terminal to an access network and steps in the method for managing the connection of a terminal according to a particular embodiment of the invention, FIG. 2B illustrates steps in the method for receiving a request for connecting a terminal to an access network according to another particular embodiment of the invention, FIGS. 3A and 3B illustrate steps in the method for establishing a communication between a transmitting terminal and a destination terminal and steps in the method for receiving a request for connecting a terminal to an access network according to other particular embodiments of the invention, FIG. 4 illustrates a device capable of implementing the method for managing the connection of a terminal according to a particular embodiment of the invention, FIG. 5 illustrates a device capable of implementing the method for establishing a communication between a transmitting terminal and a destination terminal according to a particular embodiment of the invention, FIG. 6 illustrates a message requesting connection to an access network according to a particular embodiment of the invention, FIG. 7 illustrates a response message to a request for querying the connectivity of a terminal according to a particular embodiment of the invention, FIG. 8 illustrates a device capable of implementing the method for receiving a request for connecting a destination terminal of a communication request sent by a transmitting terminal, to a first access network, according to a particular embodiment of the invention.

DESCRIPTION OF A PARTICULAR EMBODIMENT OF THE INVENTION

The environment described in FIG. 1 includes a communication network Res, e.g. a mobile IP communication network, based, for example, on an IMS architecture. The communication network Res may be composed of multiple IP communication networks managed by different operators and connected therebetween by interconnection gateways (not represented). The communication network Res may be any type of communication network making it possible to exchange data and to establish communications between terminals capable of accessing the communication network Res.

FIG. 1 also includes access networks ACC11, ACC12, ACC13 enabling a terminal connected to such access networks to access the communication network Res.

For example:
the access network ACC11 is a 3G mobile access network using a UTRAN (for Universal Terrestrial Radio Access Network in English) technology,
the access network ACC12 is a 4G mobile access network using E-UTRAN (for Evolved Universal Terrestrial Radio Access Network in English) technology,
the access network ACC13 is a WIFI access network using WLAN (for Wireless Local Access Network in English) technology.

The environment in FIG. 1 also includes terminals T1, T2 and T3 connected to the communication network Res via the access networks ACC12 and ACC11 respectively.

The terminals T1, T2 and T3 may be any type of terminals for establishing a telephone or videophone or multimedia communication, such as a mobile phone, smartphone (intelligent telephone in English), tablet, TV connected to a communication network, or a personal computer on which a telephony application, also called a softphone, is installed, or any object capable of connecting to a communication network and establishing a communication.

In the example described in FIG. 1, the terminal T1 is connected to the access network ACC12 but is located close to an access cell accessing the access network ACC11 and a point of access to the access network ACC13. The terminal T1 is capable of connecting to such access networks.

The terminal T2 is connected to the access network ACC11 but is located close to an access cell accessing the access network ACC12 and is capable of connecting to such an access network.

The terminal T3 is connected to the access network ACC11 but is located close to an access cell accessing the access network ACC12 and is capable of connecting to such an access network.

According to a particular embodiment of the invention, the environment in FIG. 1 includes two modules ANDSF1, ANDSF2 for managing the connection of a terminal to an access network. The module ANDSF1 is associated with the terminal T1 and the module ANDSF2 is associated with the terminal T2 and the terminal T3. Such a module ANDSF1, respectively ANDSF2, is, for example, an ANDSF module of a communication network managed by the operator of the terminal T1, respectively T2 and T3. Such a module ANDSF1, respectively ANDSF2, enables the operator of the terminal T1, respectively T2 and T3, to prompt the terminal T1, respectively T2 and T3, to connect to an access network determined according to criteria defined by the operator of the terminal T1, respectively T2 and T3, so that the terminal T1, respectively T2 and T3, accesses the communication network Res.

Steps in the method for establishing a communication between a transmitting terminal T1 and a destination terminal T2, steps in the method for receiving a request for connecting a terminal to an access network and steps in the method for managing the connection of a terminal to an access network will now be described in relation to FIG. 2A. In the example of FIG. 2A:
the method for establishing a communication is implemented by the terminal T1,
the method for receiving a request for connecting a terminal to an access network is implemented by the module ANDSF2,
the method for managing the connection of a terminal to an access network is implemented by the module ANDSF1 and the module ANDSF2.

In a step E201, the terminal T1 sends a message to the module ANDSF1 in order to obtain the list of available access networks close to the terminal T1 and the connection parameters relating to such access networks. Such a message is sent, for example, in the form of a message "Access Network Info Request" defined by the 3GPP standard. The message sent by the terminal T1 includes the list of the connection capabilities of the terminal T1, i.e. the network interfaces supported by the terminal T1, and a piece of information on the current connection of the terminal T1. For example, the message sent by the terminal T1 in the course of step E201 includes:
in a "UE Location" field, the value "UTRAN cell1" indicating that the terminal T1 is connected via the cell "cell1" of the access network UTRAN which corresponds, for example, to the access network ACC11,
in a "UE Capability" field, the values 2G/3G, E-UTRAN and WLAN, indicating that the terminal T1 is capable of connecting to a 2G/3G access network, to a 4G (E-UTRAN) access network, or to a WIFI (WLAN) access network.

In a step E2001, the module ANDSF1 determines a list of access networks to which the terminal T1 is likely to connect according to criteria predefined by the operator of the terminal T1 and the location of the terminal T1. For example, the location of the terminal T1 is obtained via the current connection of the terminal T1 to the UTRAN cell "cell1" or by any geolocation system, etc. In a step E2002, the module ANDSF1 transmits to the terminal T1 the list of access networks determined at step E2001. For example, the module ANDSF1 sends to the terminal T1 a message "Access Network Info Response" defined by the 3GPP standard and including:

- in a "Discovery" field, the value "WIFI SSID1" indicating to the terminal T1 the parameters necessary for connecting to the WIFI access point close to the terminal T1,
- in a "Policy" field, the values "UTRAN cell1, $1^{st}$ WLAN, $2^{nd}$ E-UTRAN, WIMAX Restricted" indicating the ordered list of access networks to which the terminal T1 can connect.

Thus, in step E2002, the message received by the terminal T1 indicates that:

- the terminal T1 can connect to the cell "cell1" of the UTRAN access network for telephone communications, the UTRAN access network corresponding, for example, to the access network ACC11 in FIG. 1,
- the terminal T1 should preferably connect to the WIFI WLAN access network for "data" (in English) communications using the connection parameters provided in the "Discovery" field, the WIFI WLAN access network corresponding, for example, to the access network ACC13 in FIG. 1,
- then if the connection to the WLAN access network is not possible, the terminal T1 should connect to the 4G E-UTRAN access network for data communications, the E-UTRAN access network corresponding, for example, to the access network ACC12 in FIG. 1,
- in the example described here, the use of a WIMAX access network is not permitted.

In a step E202, the terminal T1 selects an access network from the list of access networks received in step E2002 and the user preferences defined in advance if they exist. In step E202, the terminal T1 connects to the access network ACC13.

Similarly, in a step E203, the terminal T2 sends a message to the module ANDSF2 in order to obtain the list of available access networks close to the terminal T2 and the connection parameters relating to such access networks. For example, the message sent by the terminal T2 in the course of step E203 includes:

- in a "UE Location" field, the value "UTRAN cell5" indicating that the terminal T1 is connected via the cell "cell5" of the access network ACC11,
- in a "UE Capability" field, the values 2G/3G, E-UTRAN and WLAN, indicating that the terminal T2 is capable of connecting to a 2G/3G access network, to a 4G (E-UTRAN) access network, or to a WIFI (WLAN) access network.

In a step E2003, the module ANDSF2 determines a list of access networks to which the terminal T2 is likely to connect according to criteria predefined by the operator of the terminal T2 and the location of the terminal T2.

In a step E2004, the module ANDSF2 transmits to the terminal T2 the list of access networks determined at step E2003. For example, the message received by the terminal T2 in step E2004 indicates that the terminal T2 can connect to the cell "cell5" of the access network ACC11 for telephone communications and that the terminal T2 can connect to the access network ACC12 for "data" communications.

In a step E204, the terminal T2 selects an access network from the list of access networks received in step E2004 and the user preferences defined in advance if they exist. In step E204, the terminal T2 connects to the access network ACC11 in FIG. 1.

In a step E205, the terminal T1 detects the activation of a request for communication with the terminal T2. For example, the user of the terminal T1 has selected a piece of contact information relating to the terminal T2 in the directory of the terminal T1, and has requested the terminal T1 to establish communication with the terminal T2. The user of the terminal T1 may have requested such communication, for example, by pressing a physical button on the terminal T1, such as a key on the terminal T1, or by clicking a button displayed on a touch interface of the terminal T1 or by voice command, e.g. by uttering the command "call".

Following the detection of the activation of a communication request, in the course of a step E206, the terminal T1 transmits to the module ANDSF1 a message indicating that the terminal T1 wishes to establish a communication with the terminal T2. Such a message enables the module ANDSF1 to detect the activation of a communication request by the terminal T1. The message received by the module ANDSF1 indicating that the terminal T1 wishes to establish a communication with the terminal T2 includes, for example, a public identity of the terminal T2 for identifying a destination terminal T2 of the communication. Such a public identity is, for example, a telephone number associated with the terminal T2.

In the course of step E206, the module ANDSF1, according to the criteria set by the operator of the communication network Res, determines that when a communication is to be established between two terminals, the communication should preferably be established via a 4G access network. The module ANDSF1 then determines whether the terminal T1 is capable of connecting to such an access network. In the example described here, the module ANDSF1 determines that the terminal T1 is capable of connecting to the access network ACC12.

In the course of a step E207, the module ANDSF1 then sends to the module ANDSF2 associated with the terminal T2 a request for querying the connectivity of the terminal T2. The module ANDSF2 receives such a request in step E207. For example, such a querying request is sent by the module ANDSF1 to the module ANDSF2 in the form of a message dedicated to the invention according to the Diameter protocol. Such a protocol is commonly used for communications between servers in a communication network. The querying request sent by the module ANDSF1 includes, for example, the public identity associated with the terminal T2 so that the module ANDSF2 may identify the terminal or terminals associated with such a public identity.

In a step E208, the module ANDSF2 sends in response to the module ANDSF1 a message indicating the connectivity of the terminal T2. Such a message is, for example, described in relation to FIG. 7.

FIG. 7 illustrates an MRI part of a response message to a request for querying the connectivity of a terminal, such as the terminal T2. The MRI response message corresponds, for example, to a message adapted from the Diameter protocol. Only the data fields of such an adapted message relating to the invention are described here.

The MRI message illustrated in FIG. 7 includes:
- a data field CC1 carrying a piece of information indicating an access network to which the terminal T2 is connected. In the embodiment described here, the field CC1 indicates the access network ACC11,
- a data field CC2 carrying a piece of information indicating an access network to which the terminal T2 is capable of connecting. In the embodiment described here, the field CC2 indicates the access network ACC12.

According to other particular embodiments, the MRI message may comprise additional data fields indicating other access networks to which the terminal T2 is capable of connecting.

From the MRI response message received in step E208, the module ANDSF1 determines in a step E209 that the terminal T2 is capable of connecting to a 4G access network corresponding to the access network ACC12. In the course of step E209, the module ANDSF1 then sends to the module ANDSF2 a request for connecting the terminal T2 to the access network ACC12. Such a connection request thus includes a piece of connectivity information relating to the terminal T1. Such a connection request is, for example, illustrated in the MDC message in FIG. 6.

FIG. 6 illustrates a part of an MDC message requesting the connection of a terminal to an access network. The connection request MDC message corresponds, for example, to a message adapted according to the Diameter protocol. Only the data fields of such an adapted message relating to the invention are described here.

The MDC message includes:
- a field C1 indicating an access network to which the terminal should connect. In the particular embodiment described here, the field C1 indicates the access network ACC12. Such a field C1 corresponds to a piece of connectivity information relating to the terminal T1.
- a field ET2 indicating a piece of information identifying the terminal for which the connection request is intended. In the particular embodiment described here, the field ET2 indicates, for example, a telephone number associated with the terminal T2, since the connection request is a request aimed at requesting the terminal T2 to connect to the access network ACC12.

According to a particular embodiment of the invention, the MDC message includes a field COM carrying a piece of information for indicating the reason for the request for connecting to the access network ACC12. In the particular embodiment described here, the field COM carries a value indicating that the connection request is made for the purpose of establishing a communication with the terminal T2.

According to another particular embodiment of the invention, the MDC message includes, in addition to the field COM, a field ET1 carrying a piece of information for identifying the terminal transmitting the request for a communication to be established with the terminal T2. In the particular embodiment described here, the field ET1 indicates, for example, a telephone number of the terminal T1.

In step E209, the module ANDSF2 receives the request for connecting the terminal T2 to the access network ACC12 sent by the module ANDSF1. Such a connection request thus carries a piece of connectivity information relating to the terminal T1. Indeed, according to a particular embodiment of the invention, the pieces of information contained in the connection request make it possible to indicate to the module ANDSF2 that the terminal T1 wishes to send a communication to the terminal T2 via the access network ACC12.

In a step E210, the module ANDSF2 determines according to the criteria of the operator of the terminal T2 whether the terminal T2 is authorized to modify its connection for connecting to the access network ACC12. If the terminal T2 is authorized to do so, in step E210, the module ANDSF2 then updates the list of access networks according to the received connectivity information relating to the terminal T1, i.e. according to the connection request received in step E209.

In a step E211, the module ANDSF2 transmits such an updated list to the terminal T2. The updated list is, for example, transmitted in the form of a message "Access Network Info". Such a message indicates the access network ACC12 as first in the list.

In a step E212, the terminal T2 then selects the first access network in the updated list received and connects thereto. Following step E212, the terminal T2 is then connected to the access network ACC12.

According to a particular embodiment of the invention, the message transmitted by the module ANDSF2 to the terminal T2 in step E211 includes a piece of information on the validity of said updated list. Such a piece of validity information indicates, for example, that the updated list is valid until the end of a communication to be established between the terminal T1 and the terminal T2.

According to this particular embodiment of the invention, when the communication established between the terminal T1 and the terminal T2 is completed, the terminal T2 will disconnect from the access network ACC12 and will connect to the access network ACC11 as indicated by the list transmitted before the update in step E2004.

In a step E213, the terminal T2 sends to the module ANDSF2 a confirmation message indicating that the terminal T2 is actually connected to the access network ACC12. Such a confirmation message is transmitted in a step E214 to the module ANDSF1 by the module ANDSF2.

In a step E217, the terminal T1 determines according to the criteria defined by its operator that when a communication is activated and a 4G access network is close by, the communication should preferably be established via the 4G access network. Such criteria are, for example, stored in the memory of an ANDSF module integrated into the terminal T1 or received from the module ANDSF1 and stored by the integrated ANDSF module of the terminal T1. In step E217, the terminal T1 then connects to the access network ACC12.

In a step E218, the terminal T1 then sends a communication request to the terminal T2, via the access network ACC12. The communication request is, for example, sent in the form of an INVITE message according to the SIP protocol.

According to a particular embodiment of the invention, the terminal T2 has not been able to connect to the access network ACC12 or is not capable of connecting thereto.

For example, the terminal T2 has not been able to connect to the access network ACC12 in step E212 because the access network ACC12 has no more available bandwidth or the traffic is too great. In this case, the message sent by the terminal T2 in step E213 indicates to the module ANDSF2 that the connection of the terminal T2 to the access network ACC12 is not possible. Such a message is transmitted by the module ANDSF2 to the module ANDSF1 in step E214.

According to another example, in step E210, the module ANDSF2 determines that the terminal T2 is not authorized to connect to the access network ACC12, e.g. because the terminal T2 does not support the technology of the access network, or because the subscription of the terminal T2 is restricted. In this case, steps E211, E212 and E213 are not implemented and the module ANDSF2 transmits to the module ANDSF1 in step E214 a message indicating that the terminal T2 cannot connect to the access network ACC12.

According to another example, in step E208, the module ANDSF2 indicates in the MRI response message that the terminal T2 is not capable of connecting to the access network ACC12, e.g. because the terminal T2 is not near a cell of the access network ACC12. In this case, steps E209 through E214 are not implemented.

When the terminal T2 has not been able to connect to the access network ACC12 or is not capable of connecting thereto, a piece of connectivity information relating to the terminal T2 is received by the module ANDSF1 in step E214 or E208. The connectivity information relating to the terminal T2 received by the module ANDSF1 may include a piece of information indicating that the terminal T2 is not capable of connecting to the access network ACC12. As a variant, the connectivity information relating to the terminal T2 received by the module ANDSF1 may include a piece of information indicating at least one access network to which the terminal T2 is capable of connecting, e.g. the access network ACC11. In this case, the module ANDSF1 determines that the terminal T2 is not capable of connecting to the access network ACC12.

In a step E215, the module ANDSF1 then updates the list of access networks for the terminal T1 according to the connectivity information relating to the terminal T2. Such an updated list is transmitted by the module ANDSF1 to the terminal T1 in the course of a step E216. For example, the updated list indicates as first in the list the access network ACC11 to which the terminal T2 is connected.

In a step E217, the terminal T1 then connects to the access network ACC11 if the terminal T1 is not already connected to the access network ACC11.

In step E218, the terminal T1 then sends a communication request to the terminal T2 via the access network ACC11. When the access network ACC11 does not allow the terminal T1 to implement a communication according to the functionalities requested in step E205, e.g. when, in the course of step E205, the user has requested a videophone communication and the access network ACC11 does not allow establishing such a communication, the terminal T1 informs the user that the communication requested in step E218 will be established in an audio-only mode, for example. Thus, the user of the terminal T1 is informed that the requested communication is established according to a fallback mode.

According to another particular embodiment of the invention, steps E207 and E208 are optional. The module ANDSF1 in step E209 sends a request straight away for connecting the terminal T2 to the access network ACC12 without knowing beforehand whether the terminal T2 is capable of connecting to such an access network.

According to another particular embodiment of the invention described in relation to FIGS. 2A and 2B, the terminal T2 shares its public identity, or its telephone number, with at least one other terminal T3. According to this particular embodiment of the invention, steps similar to steps E203, E2003, E2004 and E204 are implemented for the terminal T3.

According to this particular embodiment of the invention, in step E208 illustrated in FIG. 2A, the module ANDSF2 sends a piece of information relating to the connectivity of the terminals T2 and T3.

In step E209 in FIG. 2A, the module ANDSF1 then determines whether at least one terminal of the terminals T2 and T3 is capable of connecting to the access network ACC12. If this is the case, in step E209 in FIG. 2A, the module ANDSF1 sends to the module ANDSF2 a request for connecting the terminal T2 and/or T3 to the access network ACC12. As a variant, the connection request may not specify which terminal T2 or T3 is concerned. In this variant, the module ANDSF2 determines which terminal is likely to connect to the access network ACC12.

The module ANDSF2 then implements steps E210 and E211 in FIG. 2A for each terminal associated with the public identity of the terminal T2 and capable of connecting to the access network ACC12.

The rest of the method is identical to the description given in relation to FIG. 2A and corresponding steps are implemented for the terminal T3.

In a step E218', the terminal T1 sends a communication request to the public identity of the terminal T2, via the access network ACC12 and the communication network Res.

The communication request is transmitted in a known way by the communication network Res to the terminals associated with the public identity of the terminal T2. The communication request is received by the terminal T2 in a step E2180 and by the terminal T3 in a step E2181. In a step E222, the terminal T3 accepts the communication request and sends a message of acceptance to the terminal T1.

In a step E223, communication is established between the terminal T1 and the terminal T3 in a known way.

Following the message of acceptance sent by the terminal T3 in step E222, the communication network Res in a step E224 sends a message canceling the communication request to the terminal T2.

In a step E225, the terminal T2 determines that the request for communication with the terminal T1 is canceled and then disconnects from the access network ACC12.

FIG. 3A illustrates steps in the method for establishing a communication between a transmitting terminal and a destination terminal implemented by the terminal T1 and steps in the method for receiving a request for connecting a terminal to an access network implemented by the terminal T2 according to another particular embodiment of the invention.

In a similar way to steps E201, E2001 and E2002, described in relation to FIG. 2A, in a step E301, the terminal T1 sends a message to the module ANDSF1 in order to obtain the list of available access networks close to the terminal T1 and the connection parameters relating to such access networks. In step E301, the module ANDSF1 sends to the terminal T1 the list of access networks to which the terminal T1 is authorized to connect.

In a step E302, the terminal T1 selects the access network ACC13 and connects thereto.

In a similar way to steps E203, E2003 and E2004, described in relation to FIG. 2A, in a step E303, the terminal T2 sends a message to the module ANDSF2 in order to obtain the list of available access networks close to the terminal T2 and the connection parameters relating to such access networks. In step E303, the module ANDSF2 sends to the terminal T2 the list of access networks to which the terminal T2 is authorized to connect.

In a step E304, the terminal selects the access network ACC11 and connects thereto.

In a step E305, the terminal T1 detects the activation of a request for communication with the terminal T2. For example, the user of the terminal T1 has selected a piece of contact information relating to the terminal T2 in the directory of the terminal T1, and has requested the terminal T1 to establish communication with the terminal T2. The user of the terminal T1 may have requested such communication, for example, by pressing a physical button on the terminal T1, such as a key on the terminal T1, or by clicking a button displayed on a touch interface of the terminal T1 or by voice command, e.g. by uttering the command "call".

In the course of step E305, the terminal T1 determines according to the criteria of the operator of the terminal T1 that the communication request should preferably be established via a 4G access network, here the access network ACC12.

Following the detection of the activation of a communication request, in the course of a step E307, the terminal T1 then sends to the terminal T2 a request for querying the connectivity of the terminal T2. The querying request is, for example, sent in the form of an OPTIONS message adapted to the invention, according to the SIP protocol. The terminal T2 receives such a request in step E307.

In a step E308, the terminal T2 obtains a piece of information relating to the connectivity of the terminal T2 e.g. from an ANDSF module integrated into the terminal T2. Such an ANDSF module integrated into the terminal T2 stores the list of access networks to which the terminal T2 is capable of connecting, such a list having been sent by the module ANDSF2 in step E303. In the course of step E308, the terminal T2 sends in response to the terminal T1 a message indicating the connectivity of the terminal T2. Such a message is, for example, sent in the form of an adapted 200 OK message according to the SIP protocol. The adapted SIP 200 OK message includes, for example, the fields of the MRI message described in relation to FIG. 7.

From the response message received in step E308, the terminal T1 determines in a step E309 that the terminal T2 is capable of connecting to a 4G access network corresponding to the access network ACC12. In the course of step E309, the terminal T1 then sends to the terminal T2 a request for connecting the terminal T2 to the access network ACC12. The connection request is, for example, sent in the form of an adapted INFO message according to the SIP protocol. The adapted INFO message includes, for example, the fields of the MDC message described in relation to FIG. 6.

In step E309, the terminal T2 receives the request for connecting the terminal T2 to the access network ACC12 sent by the terminal T1.

In the case where the terminal T1 determines from the response to the request for querying the connectivity of the terminal T2 that the terminal T2 is not capable of connecting to the access network ACC12, the terminal T1 does not send the connection request in step E309. A fallback solution for establishing the communication is then implemented. Such a fallback solution will be described later in relation to FIG. 3B.

In the case where, in the course of step E309, the terminal T2 has actually received the connection request sent by the terminal T1, in a step E312, the terminal T2 then modifies its connection to the communication network Res. The terminal T2 disconnects from the access network ACC11 and connects to the access network ACC12. According to the embodiment of the invention, disconnecting from the access network ACC11 is optional when the terminal T2 and the communication network Res are able to manage the connections of the terminal T2 via multiple access networks. For example, if the terminal T2 is initially connected to the access network ACC13 instead of the access network ACC11, disconnecting from the access network ACC13 is not necessary for the terminal T2 to connect to the access network ACC12.

In a step E314, the terminal T2 sends to the terminal T1 a confirmation message indicating that the terminal T2 is actually connected to the access network ACC12.

In a step E317, the terminal T1 then connects to the access network ACC12 if the terminal T1 is not already connected to the access network ACC12.

In a step E318, the terminal T1 then sends a communication request to the terminal T2, via the access network ACC12. The communication request is, for example, sent in the form of an INVITE message according to the SIP protocol.

According to another particular embodiment of the invention, steps E307 and E308 are optional. The terminal T1 in step E309 sends a request straight away for connecting the terminal T2 to the access network ACC12 without knowing beforehand whether the terminal T2 is capable of connecting to such an access network.

In this case, when the terminal T2 is not capable of connecting to the access network ACC12, the terminal T2 informs the terminal T1 by sending a message to the terminal T1 in step E314. The terminal T1 may then implement the fallback solution described in relation to FIG. 3B.

According to another particular embodiment of the invention, the terminal T2 shares its public identity, or its telephone number with at least one other terminal T3. According to this particular embodiment of the invention, steps similar to steps E303 and E304 are implemented for the terminal T3.

According to this particular embodiment of the invention, in step E307, the querying request is sent by the terminal T1 to the public identity associated with the terminal T2. The communication network Res extends such a querying request to the terminals T2 and T3.

In step E308, each terminal T2 and T3 then respectively sends to the terminal T1 a piece of information relating to the connectivity of the terminal T2 and the terminal T3 respectively.

In step E309, the terminal T1 then determines whether at least one terminal of the terminals T2 and T3 is capable of connecting to the access network ACC12. If this is the case, in step E309, the terminal T1 sends to the public identity associated with the terminal T2 a request for connecting the terminal T2 to the access network ACC12. The communication network Res extends such a connection request to the terminals T2 and T3.

Steps E312 and E314 are identical to those described previously in relation to FIG. 3A. Similar steps are implemented by the terminal T3.

In step E318, the terminal T1 sends a communication request to the public identity of the terminal T2, via the access network ACC12 and the communication network Res.

The communication request is transmitted in a known way by the communication network Res to the terminals T2 and T3. For example, the terminal T3 accepts the communication request and sends a message of acceptance to the terminal T1. Communication is then established between the terminal T1 and the terminal T3 in a known way.

Following the message of acceptance sent by the terminal T3 to the terminal T1, the communication network Res sends a message canceling the communication request to the terminal T2. The terminal T2 then determines that the request for communication with the terminal T1 is canceled and disconnects from the access network ACC12.

FIG. 3B illustrates steps in the method for establishing a communication between a transmitting terminal and a destination terminal implemented by the terminal T1 and steps in the method for receiving a request for connecting a terminal to an access network implemented by the terminal T2 according to another particular embodiment of the invention.

The description of steps E301' through E308' is identical to the description of the corresponding steps E301 and E308 described in relation to FIG. 3A.

In the particular embodiment described here, the response to the request for querying the connectivity of the terminal T2 received in step E308' by the terminal T1, indicates that the terminal T2 is not capable of connecting to the access network ACC12. The response to the request for querying the connectivity of the terminal T2 indicates, for example, that the terminal T2 is connected to the access network ACC11.

In a step E317', the terminal T1 then connects to the access network ACC11 if the terminal T1 is not already connected to the access network ACC11.

In step E318', the terminal T1 then sends a communication request to the terminal T2 via the access network ACC11.

As a variant of this particular embodiment of the invention, prior to step E317', the terminal T1 has received in step E308' a piece of connectivity information relating to the terminal T2 indicating that the terminal T2 is not capable of connecting to the access network ACC12.

In a step E319, the terminal T1 determines that the terminal T1 is not connected to the access network ACC11. In the course of step E319, the terminal T1 sends to the module ANDSF1 a request for connecting the terminal T1 to the access network ACC11. Such a connection request is used to request the module ANDSF1 for authorization for the terminal T1 to connect to the access network ACC11 for establishing a communication with the terminal T2 via the access network ACC11. Such a connection request thus includes a piece of connectivity information relating to the terminal T2.

On receiving such a connection request, in a step E320, the module ANDSF1 updates the list of access networks to which the terminal T1 is authorized to connect according to the received connection request. For example, the updated list includes in first position the access network ACC11 and does not include the access network ACC12. Optionally, the updated list includes a piece of validity information indicating that the updated list is valid for the duration of a communication to be established between the terminal T1 and the terminal T2.

In a step E321, the module ANDSF1 sends the list updated at step E320 to the terminal T1.

In a step E317', the terminal T1 then connects to the access network ACC11 according to the updated list.

In step E318', the terminal T1 then sends a communication request to the terminal T2 via the access network ACC11.

In the embodiments described in FIGS. 3A and 3B, the implementation of the modules ANDSF1 and ANDSF2 is optional. The terminals T1 and T2 may be capable of discovering only the access networks nearby without using a list of networks provided by the modules ANDSF1 and ANDSF2.

According to any one of the variants previously described in relation to FIG. 3B and according to a particular embodiment of the invention, when the access network ACC11 does not allow the terminal T1 to implement a communication according to functionalities requested in step E305 or step E205, e.g. when, in the course of step E305 or E205, the user has requested a videophone communication and the access network ACC11 does not allow establishing such a communication, the terminal T1 informs the user that the communication requested in step E318' or E218 will be established in an audio-only mode, for example. Thus, the user of the terminal T1 is informed that the requested communication is established according to a fallback mode.

The fallback mode described in relation to FIG. 3B applies of course to the cases where the terminal T2 shares its public identity with other terminals, such as the terminal T3. This fallback mode is then used in the case where no terminal associated with the public identity of T2 is capable of connecting to the access network ACC12.

According to another particular embodiment of the invention, the terminal T1 does not send a communication request in steps E218 or E318'. For example, the user of the terminal T1 is informed that a requested communication with the terminal T2 is not possible or else that such a communication will have a poorer quality than the requested communication. According to this particular embodiment of the invention, after a predetermined time, e.g. of the order of a few minutes, after the reception of the request for connecting the terminal T2 to the access network ACC12 or after the connection of the terminal T2 to the access network ACC12, the terminal T2 disconnects from the access network ACC12.

FIG. 4 illustrates a device 40 capable of implementing the method for managing the connection of a first terminal connected to a first access network and capable of connecting to a second access network according to a particular embodiment of the invention.

The device 40 includes a processing module 41, notably including a storage module MEM4, e.g. a memory, and a processing unit PROC4 provided, for example, with a microprocessor. The processing unit PROC4 is controlled by a computer program PG4 implementing the method for managing the connection of a first terminal as described in relation to FIG. 2A.

On initialization, the code instructions of the computer program PG4 are, for example, loaded into memory MEM4, before being executed by the processor of the processing unit PROC4.

The processor of the processing unit PROC4 implements the steps of the method for managing the connection of a first terminal according to the instructions of the computer program PG4. The processor of the processing unit PROC4 notably implements:
- a step of determining a list of access networks to which the first terminal is likely to connect,
- a step of receiving a piece of connectivity information relating to a second terminal with which the first terminal is likely to establish a communication, a step of updating the list of access networks according to the received connectivity information,
- a step of transmitting said updated list to the first terminal so that the first terminal connects to the second access network.

The processing module 41 is notably capable of determining a list of access networks to which the first terminal is likely to connect and updating the list of access networks according to a received piece of connectivity information.

The device 40 also includes a communication module COM4 capable of receiving a piece of connectivity information relating to the second terminal with which the first terminal is likely to establish a communication.

The communication module COM4 is also capable of transmitting said updated list to the first terminal so that the first terminal connects to the second access network.

According to a particular embodiment of the invention, the device 40 is included in a server, or in an ANDSF module of a communication network.

FIG. 5 illustrates a device 50 capable of implementing the method for establishing a communication between a transmitting terminal and a destination terminal according to a particular embodiment of the invention.

The device 50 includes a processing module 51, notably including a storage module MEM5, e.g. a memory, and a processing unit PROC5 provided, for example, with a microprocessor. The processing unit PROC5 is controlled by a computer program PG5 implementing the method for establishing a communication as described in relation to FIG. 2A or 2B, or 3A or 3B.

On initialization, the code instructions of the computer program PG5 are, for example, loaded into memory MEM5, before being executed by the processor of the processing unit PROC5.

The processor of the processing unit PROC5 implements the steps of the method for establishing a communication to be established via at least one access network between a transmitting terminal connected or capable of connecting to the access network and a destination terminal, according to the instructions of the computer program PG5. The processor of the processing unit PROC5 notably implements:

a step of detecting the activation of the communication request, a step of sending a request for connecting the destination terminal to the access network.

The processing module is notably capable of commanding a communication request to be sent to a destination terminal.

The device 50 includes a communication module COM5 enabling the device 50 to connect to a communication network and to exchange data with terminals connected to this communication network, or to establish communications with other terminals.

The communication module COM5 is notably capable of connecting to the access network and capable of sending to the destination terminal a request for connecting the destination terminal to the access network. The communication module COM5 is capable of sending a communication request to the destination terminal subsequent to the sending of said connection request.

According to a particular embodiment of the invention, the device 50 also includes a user interface module INT5 capable of detecting the activation of the communication request. Such a user interface is, for example, a numeric keypad or a touch interface enabling a user to interact on the device 50. According to this particular embodiment of the invention, the device 50 is included in a terminal, such as a mobile or fixed terminal, or a tablet, or any type of object connected to a communication network.

According to a particular embodiment of the invention, the computer program PG5 is included in an ANDSF module integrated into the device 50.

According to another particular embodiment of the invention, the processing module 51 is capable of detecting the activation of the communication request by the transmitting terminal. According to this particular embodiment of the invention, the device 50 is included in a server, or an ANDSF module of the communication network Res.

FIG. 8 illustrates a device 80 capable of implementing the method for receiving a connection request according to a particular embodiment of the invention.

The device 80 includes a processing module 81, notably including a storage module MEM8, e.g. a memory, and a processing unit PROC8 provided, for example, with a microprocessor. The processing unit PROC8 is controlled by a computer program PG8 implementing the method for receiving a request for connecting to a first access network as described in relation to FIG. 2A or 2B, or 3A or 3B.

On initialization, the code instructions of the computer program PG8 are, for example, loaded into memory MEM8, before being executed by the processor of the processing unit PROC8.

The processor of the processing unit PROC8 implements the steps of the method for receiving a request for connecting a destination terminal of a communication request sent by a transmitting terminal, to a first access network, according to the instructions of the computer program PG8. The processor of the processing unit PROC8 notably implements:

a step of receiving a request, originating from the transmitting terminal, for connecting the destination terminal to the first access network, when the destination terminal is connected to a different access network from the first access network and the destination terminal is capable of connecting to the first access network, a step of connecting the destination terminal so that the destination terminal connects to the first access network.

The device 80 includes a communication module COM8 enabling the device 80 to connect to a communication network and to exchange data with terminals connected to this communication network, or to establish communications with other terminals. The communication module COM8 is notably capable of receiving a request originating from the transmitting terminal for connecting the destination terminal to the first access network.

The processing module 81 is notably capable of commanding said communication module COM8 to connect the destination terminal to the first access network, the command from the processing module 81 being activated when the destination terminal is connected to a different access network from the first access network and the destination terminal is capable of connecting to the first access network.

According to a particular embodiment of the invention, the processing module 81 is capable of detecting the expiration of a predetermined time after the reception of a request for connecting the device 80 to the first access network or after the connection of the device 80 to the first access network and the lack of reception of a communication request originating from the transmitting terminal. According to this particular embodiment of the invention, the processing module 81 is capable of commanding the communication module COM8 so that the communication module COM8 disconnects the device 80 from the first access network. Such a command is activated following the detection of the expiration of the predetermined time and the detection of the lack of reception of the communication request originating from the transmitting terminal.

According to a particular embodiment of the invention, the processing module 81 is capable of detecting the reception by the communication module COM8 of a cancellation of the communication request transmitted by the transmitting terminal and of commanding the communication module COM8 so that the communication module COM8 disconnects the device 80 from the first access network. According to a particular embodiment of the invention, the computer program PG8 is included in an ANDSF module integrated into the device 80.

According to a particular embodiment of the invention, the device 80 is included in a terminal, such as a mobile or fixed terminal, or a tablet, or any type of object connected to a communication network.

The invention claimed is:

1. A method for managing the connection of a first terminal to an access network of a communication network, said first terminal being capable of connecting to at least a first and a second access network of the communication network, wherein said method is implemented by a management module of the communication network and comprises:
    determining a list of access networks to which the first terminal is likely to connect according to criteria of an operator of the communication network;
    transmitting the determined list of access networks to the first terminal so that the first terminal selects in the list the first access network and connects thereto;
    after receiving a piece of connectivity information relating to a second terminal which has activated a request for establishing a telephone or videophone or multimedia communication with the first terminal, said piece of connectivity information taking into account criteria of the operator of the communication network to establish said telephone or videophone or multimedia communication and capabilities in terms of connectivity of the second terminal:
        updating the list of access networks according to the received connectivity information, and
        transmitting said updated list to the first terminal so that the first terminal connects to the second access network to establish the telephone or videophone or multimedia communication with the second terminal;
    wherein the second terminal is a user communication terminal for communicating with the first terminal utilizing a telephone or videophone or multimedia communication channel.

2. The method for managing the connection of a first terminal as claimed in claim 1, wherein the connectivity information relating to the second terminal corresponds to a piece of information indicating that the second terminal is not capable of connecting to the first access network.

3. The method for managing the connection of a first terminal as claimed in claim 1, wherein the connectivity information relating to the second terminal corresponds to a request for connecting the first terminal to the second access network, said connection request having been sent by a management module associated with the second terminal, prior to the second terminal sending a communication request to the first terminal.

4. The method for managing the connection of a first terminal as claimed in claim 1, wherein the updated list is transmitted with a piece of information on the validity of said updated list indicating that the updated list is valid until the end of a communication to be established between the first terminal and the second terminal.

5. A device for managing the connection of a first terminal to an access network of a communication network, said first terminal being capable of connecting to at least a first and a second access network of the communication network and capable of connecting to a second access network accessing said communication network, the management device including:
    a processing module capable of determining a list of access networks to which the first terminal is likely to connect according to criteria by of the operator of the communication network;
    a transmission module capable of transmitting the determined list of access networks to the first terminal so that the first terminal selects in the list the first access network and connects thereto;
    a communication module capable of receiving a piece of connectivity information relating to a second terminal which has activated a request for establishing a telephone or videophone or multimedia communication with the first terminal, wherein the second terminal is a user communication terminal for communicating with the first terminal utilizing a telephone or videophone or multimedia communication channel, said piece of connectivity information taking into account criteria set by the operator of the communication network to establish said telephone or videophone or multimedia communication and capabilities in terms of connectivity of the second terminal,
    the processing module being capable of updating the list of access networks according to said connectivity information received beforehand by the communication module, and
    the communication module being capable of transmitting said updated list to the first terminal so that the first terminal connects to the second access network to establish the telephone or videophone or multimedia communication with the second terminal.

6. The method for managing the connection of a first terminal as claimed in claim 2, wherein the updated list is transmitted with a piece of information on the validity of said updated list indicating that the updated list is valid until the end of a communication to be established between the first terminal and the second terminal.

7. The method for managing the connection of a first terminal as claimed in claim 3, wherein the updated list is transmitted with a piece of information on the validity of said updated list indicating that the updated list is valid until the end of a communication to be established between the first terminal and the second terminal.

* * * * *